United States Patent [19]
Kotake et al.

[11] Patent Number: 6,001,154
[45] Date of Patent: Dec. 14, 1999

[54] GAS-LIQUID CONTACT APPARATUS

[75] Inventors: Shinichiro Kotake; Kazuaki Kimura; Eiji Ochi, all of Tokyo; Toru Takashina; Susumu Okino, both of Hiroshima, all of Japan

[73] Assignee: Mitsubishi Heavy Industries, Ltd., Tokyo, Japan

[21] Appl. No.: 09/073,349

[22] Filed: May 6, 1998

[30] Foreign Application Priority Data

May 23, 1997 [JP] Japan ..................................... 9-150203

[51] Int. Cl.⁶ .................................................. B01D 47/06
[52] U.S. Cl. ................................ 96/234; 95/235; 96/262; 96/265; 96/322; 96/326; 96/355
[58] Field of Search ............................. 95/235, 188, 186, 95/187, 217, 213; 96/234, 243, 262, 265, 270, 271, 322, 326, 355; 261/115, 116, 117

[56] References Cited

FOREIGN PATENT DOCUMENTS

| 0 490 298 | 6/1992 | European Pat. Off. . |
| 0 682 972 | 11/1995 | European Pat. Off. . |
| 59-53828 | 4/1984 | Japan . |
| 96/14138 | 5/1996 | WIPO . |
| 97/09111 | 3/1997 | WIPO . |

OTHER PUBLICATIONS

Kazuhiko; "Multistage Spray Tower"; Patent Abstracts of Japan; Publication No. 54 042364; Publication Date: Apr. 4, 1979; vol. 003, No. 068; (Jun. 13, 1979).

*Primary Examiner*—Duane S. Smith
*Attorney, Agent, or Firm*—Foley & Lardner

[57] ABSTRACT

The present invention provides a gas-liquid contact apparatus which can make the equipment more compact and reduce the cost while achieving high gas-liquid contact efficiency. In the apparatus of the present invention, an oxidation tank (2) is installed in proximity to an absorption tower (1), and an absorbing fluid (3) is stored in this oxidation tank (2). The level H of the absorbing fluid (3) is determined so as to be above the position of nozzles (7), whereby the absorbing fluid is spouted upward from the nozzles (7). Flue gas is introduced into the absorption tower (1) from a flue gas inlet section (8) and made to flow upward at a high velocity, so that the peaks of the spouted streams are raised above level H. The absorbing fluid (3) is caught by catcher device (11) installed at a position above level H, and returned to the oxidation tank (2) through a circulation pipe (12). An air pipe (20) is connected to the circulation pipe (12) so as to suck in air.

8 Claims, 5 Drawing Sheets

FIG. I

GAS-LIQUID CONTACT APPARATUS

FIELD OF THE INVENTION AND RELATED ART STATEMENT

This invention relates to a gas-liquid contact apparatus for use, for example, in the desulfurization and other treatment of flue gas wherein an absorbing fluid is spouted in an absorption tower through which flue gas flows, and thereby brought into gas-liquid contact with the flue gas.

Conventionally, various types of gas-liquid contact apparatus are being used as wet flue gas desulfurizers for removing harmful substances (e.g., sulfur dioxide) from the flue gas of a coal-fired boiler or the like. As an example of such gas-liquid contact apparatus, an apparatus of the so-called liquid column type is disclosed in Japanese Utility Model Laid-Open No. 53828/'84).

In this apparatus, an absorbing fluid (e.g., a lime slurry) is spouted upward in the form of liquid columns from a plurality of nozzles disposed in the absorption tower, and flue gas is made to flow through these spouted streams of the absorption fluid. Thus, sulfur dioxide and dust (e.g., fly ash) contained in the flue gas can be effectively removed.

The basic construction thereof is such that, as schematically illustrated in FIG. 5, flue gas inlet or outlet sections 52 and 53 for introducing or discharging flue gas are defined in the upper and lower parts of an absorption tower 51. At the same time, header pipes 54 are disposed in absorption tower 51 and a large number of upward facing nozzles 55 are formed on these header pipes 54.

Moreover, a fluid reservoir 56 for storing an absorbing fluid (e.g., a lime slurry) 57 is defined at the bottom of absorption tower 51. This fluid reservoir 56 communicates with the aforesaid header pipes 54 by means of a circulation pipe 58, and an injection pump 59 is installed in this circulation pipe 58.

In the gas-liquid contact apparatus having the above-described construction, pump 59 is operated to spout absorbing fluid 57 upward from upward nozzles 55. On the other hand, flue gas is introduced from one of flue gas inlet or outlet sections 52 and 53 and made to flow through the spouted streams of absorbing fluid 57, so that gas-liquid contact is effected. The treated flue gas from which sulfur dioxide and the like have been removed is discharged from the other of flue gas inlet or outlet sections 52 and 53.

According to this technique in which absorbing fluid 57 is spouted upward, gas-liquid contact is effected over a long period of time during which the absorbing fluid makes a round trip (i.e., rises and falls). Moreover, when the spouted streams reach their peaks and falls down while spreading like umbrellas, absorbing fluid 57 is divided into liquid droplets and thereby enhances the gas-liquid contact effect. When the content of sulfur dioxide and the like in flue gas is low, an economical operation may be carried out by varying the height of liquid columns. Furthermore, as compared with an apparatus of the so-called packed tower type in which an absorbing fluid is made to flow downward through a tower packed with lattice-like grids and thereby brought into contact with a gas, the apparatus of the aforesaid type has several advantages, for example, in that the fluid passage of this apparatus is less liable to clog.

In the above-described technique, however, injection pump 59 having a high power load is operated to spout absorbing fluid 57 within fluid reservoir 56 from nozzles 55 (only one injection pump is shown in FIG. 5 for the sake of simplicity, but a plurality of injection pumps are actually used). In order to make the apparatus more compact and reduce the equipment cost and the operating cost, it would be desirable to omit such injection pumps.

Accordingly, an object of the present invention is to provide a gas-liquid contact apparatus which can make the equipment more compact and reduce the equipment cost, operating cost and other costs without decreasing the efficiency of absorption of sulfur dioxide and the like.

SUMMARY OF THE INVENTION

In order to solve the above-described problems, the present invention provides a gas-liquid contact apparatus comprising an absorption tower in which the desulfurization and other treatment of flue gas is carried out by spouting an absorbing fluid stored in a fluid reservoir upward from nozzles disposed in the absorption tower and, at the same time, introducing the flue gas into the absorption tower from the lower part thereof and making it flow upward through the absorbing fluid injection region, characterized in that the fluid level of the fluid reservoir is determined so as to be above the position of the nozzles, catcher means is installed at a position which is above the fluid level and enables the catcher means to catch at least a portion of the absorbing fluid spouted from the nozzles, and the absorbing fluid caught by the catcher means is returned to the fluid reservoir through a circulation passage.

The reason why the fluid level of the fluid reservoir is determined so as to be above the position of the nozzles is that the absorbing fluid is spouted from the nozzles by the action of the pressure head of the fluid stored in the fluid reservoir (i.e., the difference between the height of the fluid surface and the height of the nozzles).

Thus, since the absorbing fluid is spouted by the action of the pressure head of the fluid within the fluid reservoir, the necessity of using injection pumps having a high power load can be eliminated.

Moreover, catcher means is installed at a position above the fluid level, and the absorbing fluid is spouted from the nozzles to a height above the catcher means. Thus, at least a portion of the falling absorbing fluid is caught by the catcher means and returned to the fluid reservoir so that the fluid level of the fluid reservoir may be kept constant.

The catcher means used herein may comprise, for example, gutter-like members which are suitably arranged so as to pass the streams spouted upward but efficiently receive the absorbing fluid falling from the peaks of the streams while spreading like umbrellas; a cyclone-like means which catches the absorbing fluid by gathering the uppermost portions of the spouted streams in the neighborhood of the sidewall of the absorption tower; or other suitable means.

In this case, the proportion of the absorbing fluid caught by the catcher means should preferably be as high as possible, and it is ideal that the absorbing fluid is completely caught and returned. If some of the absorbing fluid falls down instead of being caught by the catcher means, the uncaught portion of the absorbing fluid may be handled, for example, by accumulating it in the lower part of the absorption tower and returning it to the fluid reservoir by means of a circulating pump having a low power load.

Moreover, in order that the peaks of the streams spouted upward from the nozzles may be raised above the fluid level of the fluid reservoir, flue gas is made to flow in the same upward direction as the absorbing fluid is spouted. Thus, the flow of the flue gas acts on the spouted streams so as to raise them above the fluid level.

Furthermore, the aforesaid circulation passage permits the absorbing fluid caught by the catcher means to flow into the fluid reservoir by its own weight. This circulation passage may comprise, for example, a trough or gutter which is open to the atmosphere and hence allows the circulating fluid to come into contact with the atmosphere. However, the circulation passage should preferably comprise a pipe or hose which is shielded from the atmosphere and hence has no possibility of allowing the concurrently flowing untreated flue gas to leak into the atmosphere.

This gas-liquid contact apparatus may be applied, for example, to an absorption tower functioning as a wet flue gas desulfurizer or an absorption tower functioning as an apparatus for removing other harmful gases (e.g., hydrogen chloride, fluorine, hydrogen fluoride and silicon fluoride).

In the gas-liquid contact apparatus of the present invention, mist collector means may be installed within the absorption tower at a position above the absorbing fluid spouting section thereof, and the mist collected by this mist collector means may be returned to the fluid reservoir.

Specifically, when the flue gas is made to flow in the same direction as the absorbing fluid is spouted, the amount of mist contained in the flue gas having passed through the spouted streams is increased. If the flue gas is discharged as it is, not only the absorbing fluid is wasted, but also the treated flue gas having the mist mixed therein is undesirably emitted out of the system. Accordingly, mist collector means is installed above the spouted streams for the purpose of collecting and returning the mist.

The mist collector means used herein may comprise any of various devices such as those of the baffle plate type, folded plate type, cyclone type or wire mesh type.

Moreover, the cross-sectional area of the upper part of the absorption tower may be enlarged. For example, if the cross-sectional area of the absorption tower is enlarged in the vicinity of the peaks of the spouted streams, this enlarged cross-sectional area reduces the flow velocity of the flue gas and thereby promotes the falling of liquid droplets from the spouted streams. Thus, the effect of recovering the absorbing fluid can be enhanced.

Moreover, the fluid reservoir may be made to function as an oxidation tank for effecting the oxidation reaction of the absorbing fluid.

In a gas-liquid contact apparatus functioning as a wet flue gas desulfurizer, sulfur dioxide is absorbed into the absorbing fluid to form a sulfite. Then, this sulfite is oxidized by supplying air (oxygen) to the absorbing fluid. Where the gas-liquid contact apparatus of the present invention is applied, for example, to a wet flue gas desulfurizer or the like, the fluid reservoir may be made to function as an oxidation tank in which the absorbing fluid is oxidized by air (oxygen) supplied to this oxidation tank. This makes a separately installed oxidation tank unnecessary, resulting in a simplification of the whole equipment.

Moreover, the circulation passage for returning the absorbing fluid from the catcher means to the fluid reservoir may comprise a circulation pipe shielded from the atmosphere.

Specifically, where the fluid reservoir functions as an oxidation tank, the circulation passage comprising a trough or other member open to the atmosphere is not desirable because the untreated flue gas within the absorption tower diffuses into the atmosphere. Accordingly, the circulation passage is formed of a circulation pipe shielded from the atmosphere so that the untreated flue gas flowing together with the circulating fluid may be introduced into the oxidation tank without diffusing into the atmosphere.

In this case, the circulation pipe shielded from the atmosphere may comprise, for example, a pipe or a hose.

Where the fluid reservoir functions as an oxidation tank, the circulation pipe may have a lower end extending downward and submerged in the absorbing fluid within the fluid reservoir, and air pipe may be connected to the circulation pipe so that air (oxygen) is supplied to the absorbing fluid within the fluid reservoir simultaneously with the return of the absorbing fluid.

The air (oxygen) so supplied serves to effect oxidation reaction. When the air pipe is connected to the circulation pipe, the absorbing fluid flowing downward through the circulation pipe by its own weight causes air to be sucked in and entrained into the fluid reservoir, so that an air feed blower and related components may be omitted.

Moreover, since the lower end of the circulation pipe is submerged in the absorbing fluid within the fluid reservoir, air (oxygen) can be effectively introduced into the absorbing fluid.

Moreover, the flue gas is preferably made to flow at a high velocity of not less than 5 m/sec.

In the case of a conventional gas-liquid contact apparatus of the so-called liquid column type, the flow velocity of flue gas is usually not greater than 5 m/sec. In the gas-liquid contact apparatus of the present invention, a flow velocity of not less than 5 m/sec is employed. This not only enhances the effect of lifting the spouted streams of the absorbing fluid and thereby raises the peaks of the spouted streams higher, but also increases the amount of absorbing fluid staying in the flue gas (i.e., the holdup of the absorbing fluid). Moreover, the interior of the liquid droplets is sufficiently stirred to cause an increase in the absorption rate of the liquid droplets.

Furthermore, the velocity of the liquid droplets relative to the flue gas regarded as a viscous fluid is increased, so that the boundary film formed on the surface of the liquid droplets becomes thinner. For this and other reasons, the gas-liquid contact effect is enhanced to achieve higher desulfurization efficiency than conventional.

In this connection, FIG. 4 shows the results of an experiment in which, using a gas-liquid contact apparatus in accordance with the present invention, the relationship between the flow velocity (m/sec) of the flue gas and the degree of desulfurization (%) was examined by maintaining the circulation rate of the absorbing fluid and the height of liquid columns at certain fixed values. By this experiment, the present inventors have found that, if the flow velocity of the flue gas exceeds 5 m/sec, the degree of desulfurization is improved as the flow velocity becomes higher.

Moreover, if the flow velocity of the flue gas is increased, the flow rate may be secured in spite of a decrease in the cross-sectional area of the absorption tower. Accordingly, the absorption tower can be made more compact and the number of nozzles can also be decreased, resulting in a reduced equipment cost.

As described above, the gas-liquid contact apparatus of the present invention is characterized in that the fluid level of the fluid reservoir is determined so as to be above the position of the nozzles, catcher means for catching at least a portion of the absorbing fluid spouted by the action of pressure head at a position above the fluid level is installed, and the absorbing fluid caught by the catcher means is returned through a circulation passage. Thus, the necessity of using injection pumps having a high power load can be eliminated and, therefore, the operating cost can be reduced.

Moreover, if the mist collected by mist collector means is returned to the fluid reservoir, the absorbing fluid can be used efficiently and the flue gas containing no mist can be discharged. Moreover, if the cross-sectional area of the upper part of the absorption tower is enlarged, the absorbing fluid can be recovered more effectively.

Moreover, the fluid reservoir is made to function as an oxidation tank, the overall construction of the equipment, for example, of a wet flue gas desulfurizer can be made more compact.

Moreover, if the circulation passage comprises a circulation pipe shielded from the atmosphere, the untreated flue gas is prevented from being emitted into the atmosphere. Moreover, if the circulation pipe has a lower end extending downward and submerged in the absorbing fluid within the fluid reservoir, and an air pipe is connected to the circulation pipe, air (oxygen) can be automatically and effectively supplied to the oxidation tank, and the equipment can be simplified.

Furthermore, if the flue gas is made to flow at a rate higher than a predetermined rate, an improvement in desulfurization efficiency can be achieved and the equipment can be made more compact, for example, owing to a decrease in cross-sectional area.

DETAILED DESCRIPTION OF PREFERRED EMBODIMENT

One embodiment of the present invention will be described hereinbelow with reference to the accompanying drawings.

Figure 1:
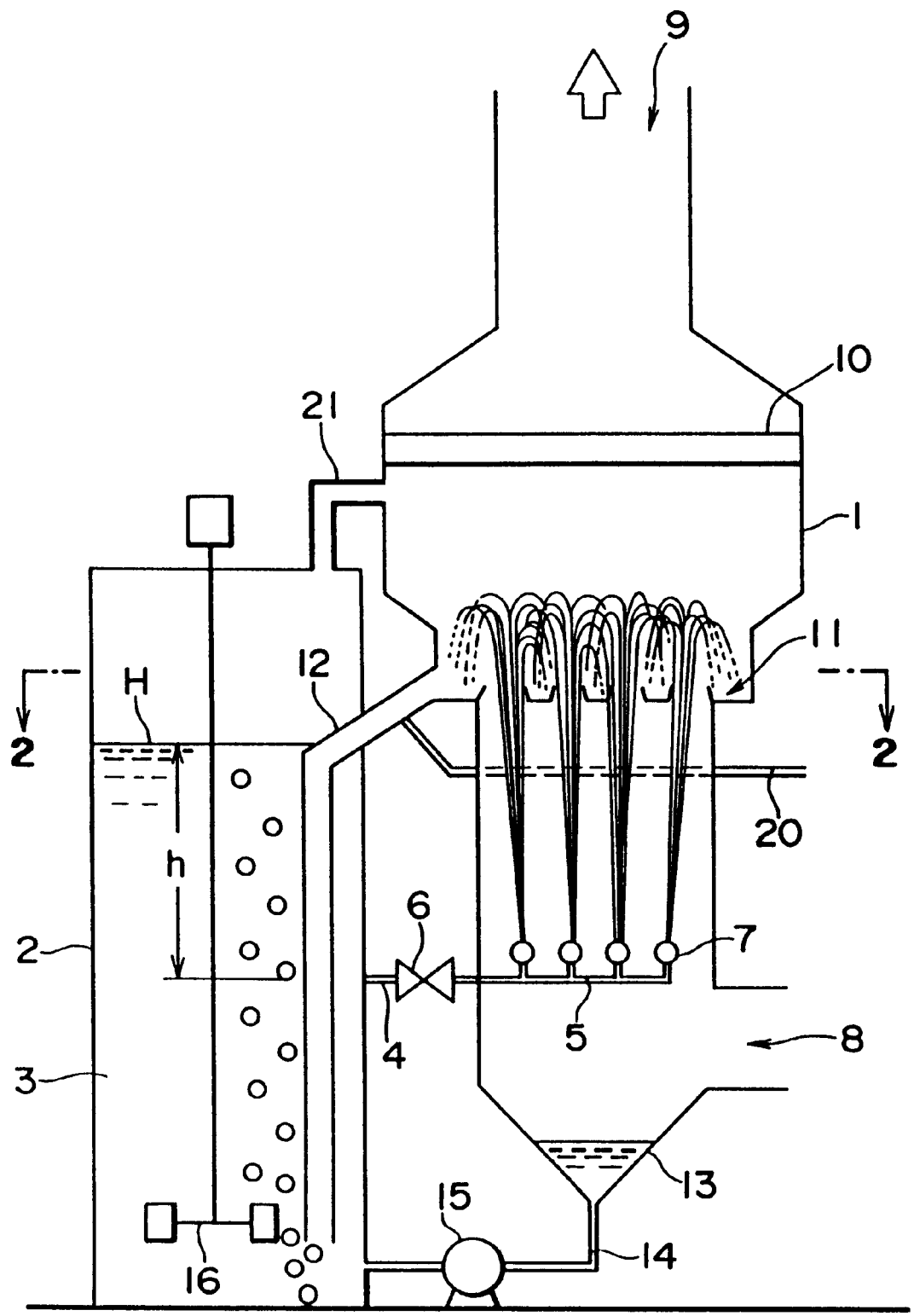
FIG. 1 is a schematic view of an exemplary gas-liquid contact apparatus in accordance with the present invention.
Figure 2:
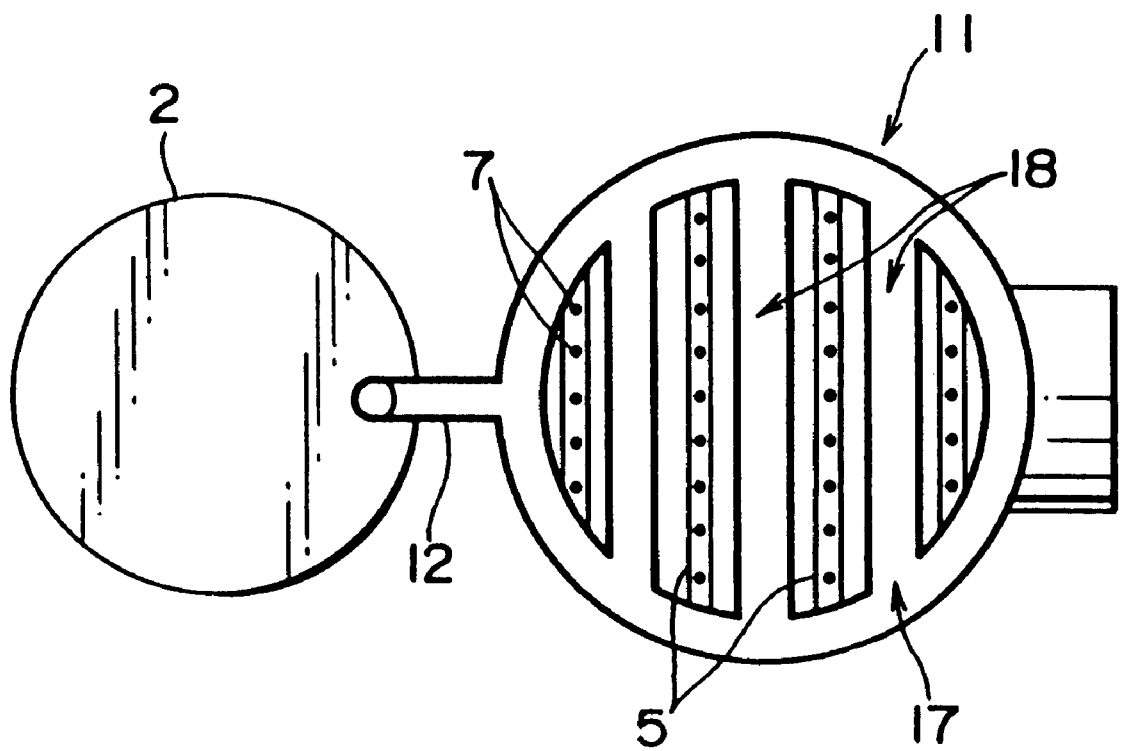
FIG. 2 is a sectional view taken on line A—A in FIG. 1.
Figure 3:
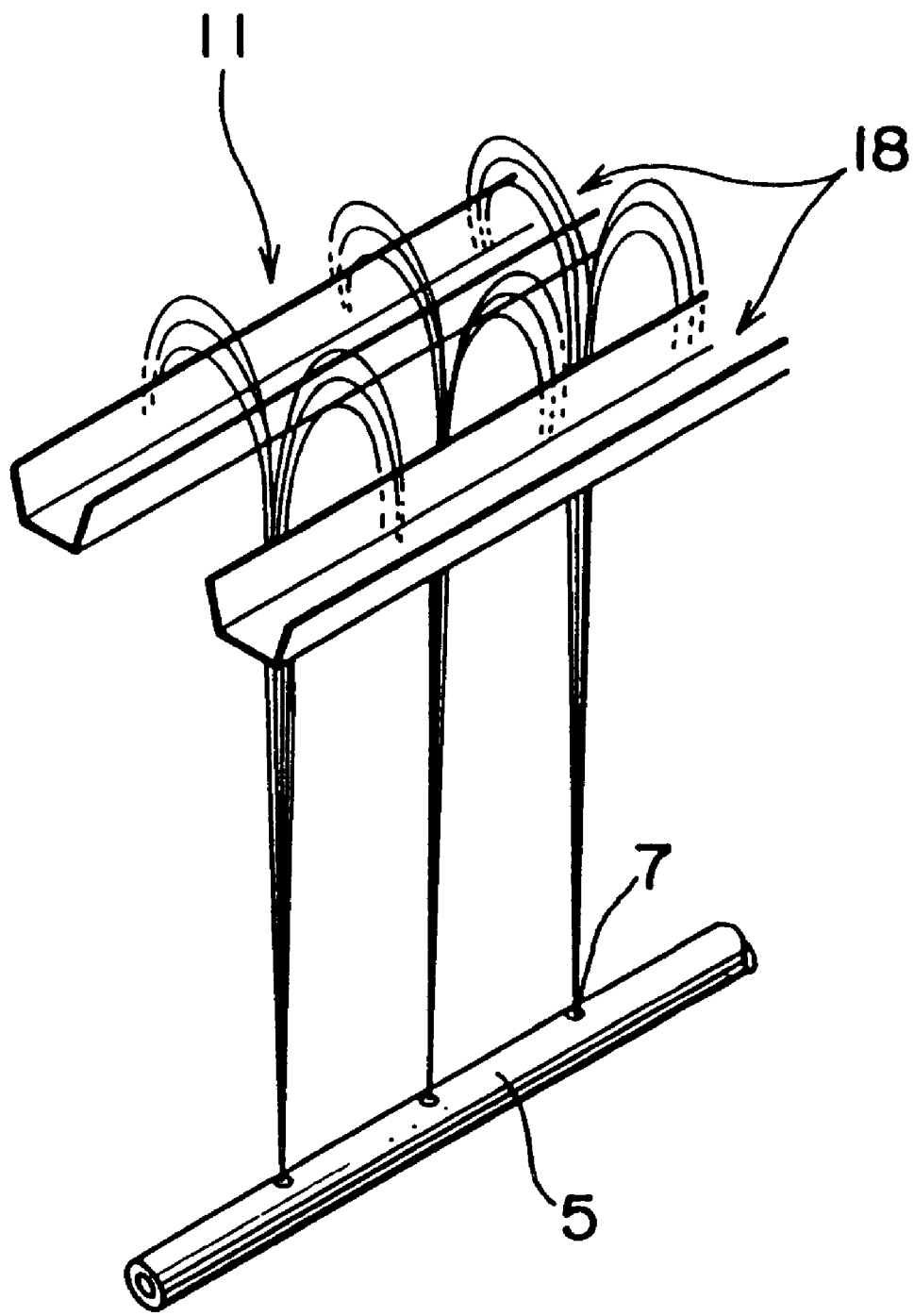
FIG. 3 is a perspective view of the catcher means used therein.
Figure 4:
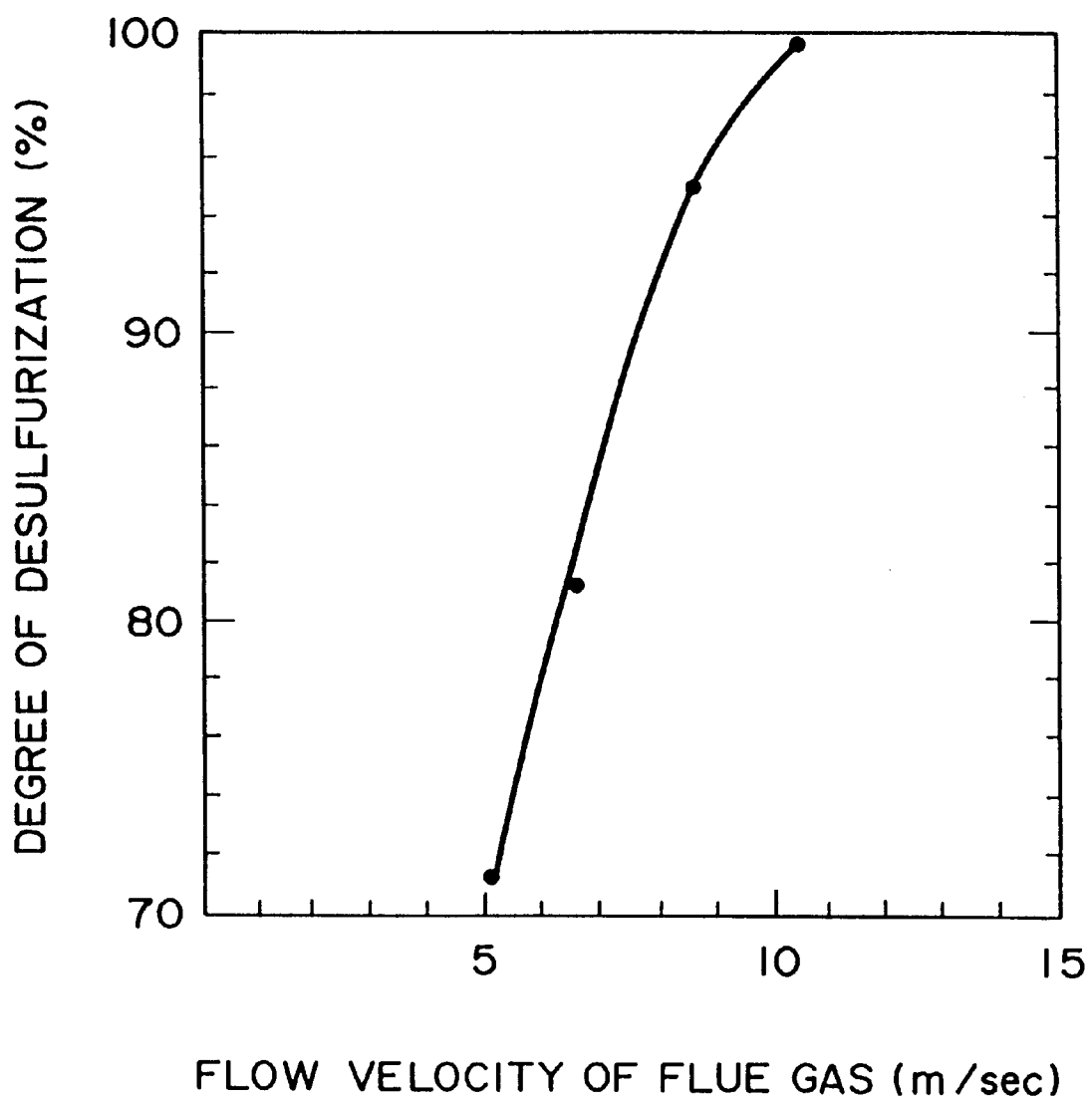
FIG. 4 is a graph showing the relationship between the flow velocity of flue gas and the degree of desulfurization, the flow velocity (in m/sec) of flue gas being plotted as abscissa and the degree of desulfurization (in %) as ordinate.
Figure 5:
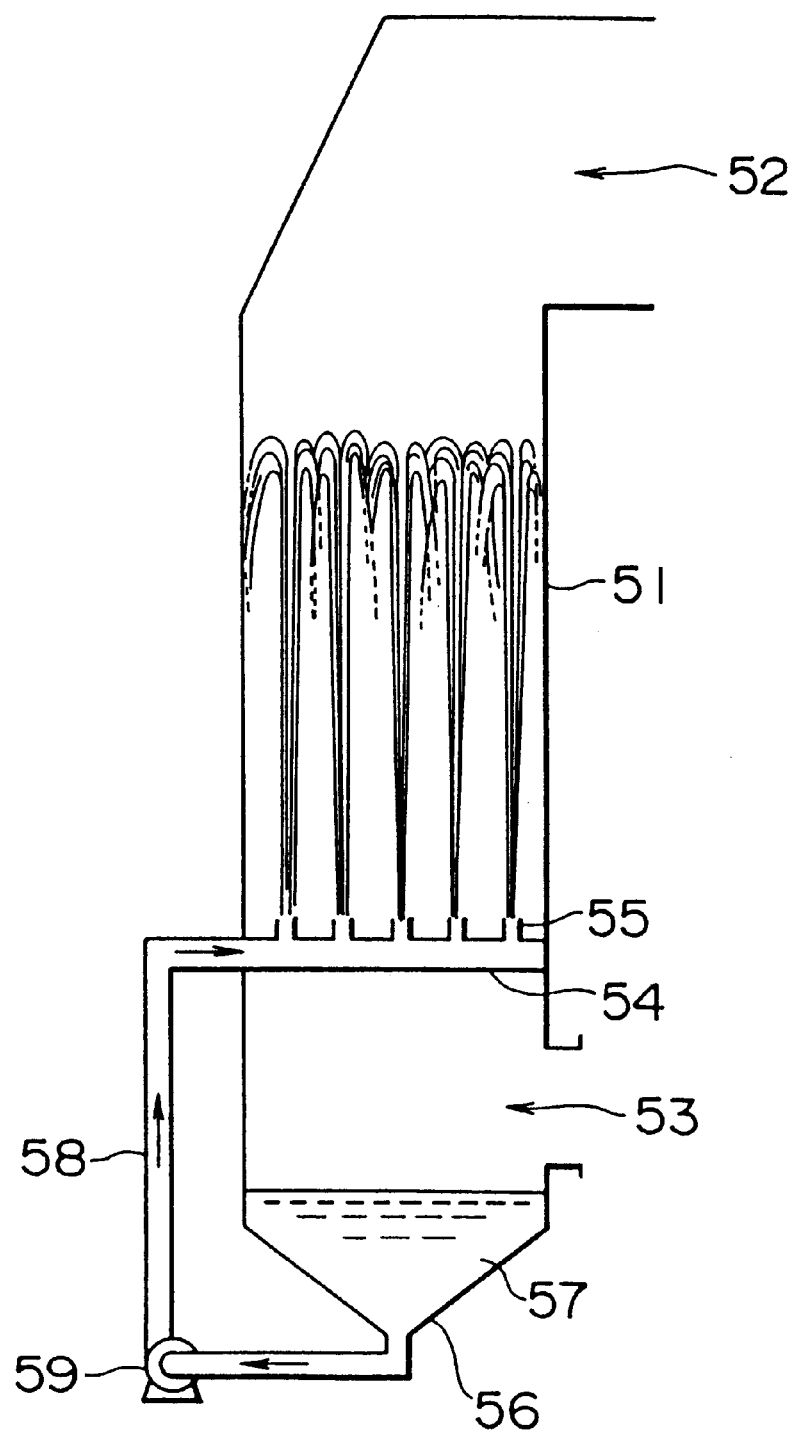
FIG. 5 is a schematic view of a conventional gas-liquid contact apparatus.

FIG. 1 is a schematic view of an exemplary gas-liquid contact apparatus in accordance with the present invention, FIG. 2 is a sectional view taken on line A—A in FIG. 1, and FIG. 3 is a perspective view of the catcher means used therein.

The gas-liquid contact apparatus of the present invention can be applied, for example, to an absorption tower of a wet flue gas desulfurizer, and is constructed so as to bring about an improvement in a gas-liquid contact apparatus of the so-called liquid column type in which an absorbing fluid (e.g., a lime slurry) is spouted upward from nozzles and brought into contact with flue gas flowing therethrough so as to absorb sulfur dioxide into the absorbing fluid. In this connection, oxygen is supplied to the absorbing fluid having sulfur dioxide absorbed thereinto, so that the resulting sulfite is oxidized to form gypsum.

Alternatively, in some case, the sulfite is not oxidized but recovered as a crystalline solid.

In an exemplary gas-liquid contact apparatus in accordance with the present invention, as illustrated in FIG. 1, an oxidation tank 2 serving as a fluid reservoir is installed in close proximity to an absorption tower 1, and an absorbing fluid 3 is stored in this oxidation tank 2. Where it is desired to recover the sulfite directly as a by-product, oxidation tank 2 need not serve for oxidation purposes, but may only function as a fluid reservoir.

Absorption tower 1 is equipped with header pipes 5 which communicate with oxidation tank 2 by means of a connecting pipe 4. This connecting pipe 4 is equipped with a valve 6 for opening or closing the pipe line, and the aforesaid header pipes 5 have a large number of nozzles 7 for spouting absorbing fluid 3 upward.

A flue gas inlet section 8 for introducing flue gas into absorption tower 1 is formed in the lower part thereof, and a flue gas outlet section 9 for discharging the flue gas from absorption tower 1 is formed in the upper part thereof. The flue gas introduced from flue gas inlet section 8 is made to flow upward through absorption tower 1, and thereby brought into gas-liquid contact with the spouted streams of the absorbing fluid. The treated flue gas is discharged from flue gas outlet section 9.

In the present invention, the flue gas is made to flow from flue gas inlet section 8 toward flue gas outlet section 9 as will be described later. Thus, the peaks of the streams spouted from nozzles 7 are raised and, at the same time, an improvement in desulfurization efficiency is achieved.

Moreover, a mist eliminator 10 serving as mist collector means is installed above the absorbing fluid injection region of absorption tower 1 so that any mist contained in the treated flue gas may be collected thereby. In addition, catcher means 11 as will be described later is installed in the upper middle part of absorption tower 1 so that at least a portion of absorbing fluid 3 spouted from nozzles 7 may be caught thereby.

Moreover, in order to return the caught portion of absorbing fluid 3 to oxidation tank 2, a circulation pipe 12 comprising a pipe or hose extends from catcher means 11 to oxidation tank 2.

Moreover, the cross-sectional area of absorption tower 1 is enlarged in the vicinity of the peaks of the spouted streams, so that this enlarged cross-sectional area reduces the flow velocity of the spouted streams and thereby promotes the falling of liquid droplets. At the same time, a circular trough 17 forming part of catcher means 11 as will be described later is installed by utilizing the step resulting from the enlargement of the cross-sectional area.

Furthermore, a recovery section 13 for receiving that portion of absorbing fluid 3 not caught by catcher means 11 is installed in the lower part of absorption tower 1. In order to return absorbing fluid 3 accumulated in this recovery section 13 to oxidation tank 2, a return pipe 14 is installed between recovery section 13 and oxidation tank 2. This return pipe 14 is equipped with a recovery pump 15.

As described previously, absorbing fluid 3 is stored in aforesaid oxidation tank 2. The level H of this absorbing fluid 3 is determined so as to be above the position of the aforesaid nozzles 7. This oxidation tank 2 is equipped with an agitator 16 for agitating absorbing fluid 3.

Moreover, a withdrawal line for withdrawing the slurry from oxidation tank 2, a feed line for replenishing absorbing fluid 3, and the like are also connected to oxidation tank 2, but they are not shown in FIG. 1 for the sake of simplicity.

Now, the aforesaid catcher means 11 is explained with further reference to FIGS. 2 and 3.

Catcher means 11 comprises, for example, a circular trough 17 formed on the step in the inner wall of absorption tower 1, and a plurality of gutter members 18 extending in parallel with the aforesaid header pipes 5. These circular trough 17 and gutter members 18 are positioned above the level H of absorbing fluid 3 within oxidation tank 2.

As illustrated, for example, in FIGS. 2 and 3, gutter members 18 are disposed so that they do not interrupt the streams spouted upward and, at the same time, they can effectively catch the absorbing fluid falling from the peaks of the streams while spreading like umbrellas. In the illustrated embodiment, gutter members 18 and header pipes 5 are arranged alternately, and each gutter member 18 is positioned halfway between adjacent header pipes 5.

Moreover, as illustrated in FIG. 2, the ends of each gutter member 18 are connected to circular trough 17 so as to communicated therewith. If necessary, additional consideration is given to gutter members 18. For example, in order to cause the received absorbing fluid to flow smoothly into circular trough 17, gutter members 18 are sloped so that the central part of each gutter member 18 is elevated above its ends (of the circular trough side).

As a matter of course, gutter members 18 may be disposed in any desired manner. So long as the spouted absorbing fluid can be effectively caught, gutter members 18 may be arranged so as to have two or more header pipes 5 interposed therebetween. Alternatively, gutter members 18 may be arranged like a lattice by disposing them both in a direction parallel to header pipes 5 and in a direction perpendicular thereto. Furthermore, it is also possible to install only circular trough 17 on the sidewall of the absorption tower and omit gutter members 18.

The upper end of circulation pipe 12 is connected to the aforesaid circular trough 17, while the lower end of circulation pipe 12 is submerged in absorbing fluid 3 within oxidation tank 2 and extends to the neighborhood of the bottom thereof. Thus, the caught portion of absorbing fluid 3 is allowed to flow downward through circulation pipe 12 by its own weight and return to oxidation tank 2.

Moreover, an air pipe 20 is connected to this circulation pipe 12. Thus, while the absorbing fluid caught by catcher means 11 flows downward through circulation pipe 12 by its own weight, air is sucked in through air pipe 20 and entrained into oxidation tank 2.

Furthermore, a venting equalizer 21 is installed between oxidation tank 2 and absorption tower 1. Thus, the residual air present in the upper space of oxidation tank 2, which consists essentially of nitrogen gas, is conducted to flue gas outlet section 9 of absorption tower 1.

The operation of the gas-liquid contact apparatus having the above-described construction is described below.

As illustrated in FIG. 1, absorbing fluid 3 is fed to oxidation tank 2, and its level H is determined so as to be above the position of nozzles 7 and below the position of catcher means 11. In this condition, valve 6 in connecting pipe 4 is operated so as to cause oxidation tank 2 to communicate with header pipes 5. At the same time, flue gas is introduced from flue gas inlet section 8 at a high flow velocity.

Thus, absorbing fluid 3 is pouted upward from nozzles 7 by the action of the pressure head defined by the difference (h) in height between the fluid level H of oxidation tank 2 and nozzles 7. Moreover, owing to the lifting effect of the flue gas introduced from flue gas inlet section 8 at a high flow velocity, the peaks of the spouted streams are further raised above fluid level H. Consequently, the spouted streams pass through the openings between gutter members 18 and rise to a position above fluid level H.

In the illustrated embodiment, the flow velocity of the flue gas is not less than 5 m/sec (and preferably in the range of 5 to 15 m/sec). This not only enhances the effect of lifting the spouted streams, but also brings about an improvement in desulfurization efficiency owing to an increase in gas-liquid contact efficiency.

After the spouted streams rise through the openings between gutter members 18 and reach their peaks, they fall down while spreading like umbrellas. The major portion of the absorbing fluid constituting the streams is caught by gutter members 18 and circular trough 17, and the remainder falls into recovery section 13.

That portion of absorbing fluid which is caught by catcher means 11 flows downward through circulation pipe 12 by its own weight and joins in absorbing fluid 3 within oxidation tank 2. On its way to oxidation tank, air is sucked in through air pipe 20 and entrained into the absorbing fluid 3 within oxidation tank 2.

Since the lower end of circulation pipe 12 is submerged in the absorbing fluid within oxidation tank 2, the air sucked in through air pipe 20 can be effectively introduced into the absorbing fluid.

On the other hand, that portion of absorbing fluid 3 which has fallen into recovery section 13 is returned to oxidation tank 2 by the operation of recovery pump 15 having a low power load.

In oxidation tank 2, agitator 16 is operated and the oxidation of absorbing fluid 3 is promoted by the air (oxygen) sucked in through air pipe 20. If necessary, additional air (oxygen) may be supplied through the bottom of oxidation tank 2.

That portion of absorbing fluid 3 which has been converted into a concentrated slurry as a result of the oxidation thereof is withdrawn through a withdrawal line (not shown) and transferred to a downstream step where it is subjected to a treatment for the formation of gypsum. Moreover, if necessary, fresh absorbing fluid 3 is replenished through a feed line (not shown).

The residual air present in the upper space of oxidation tank 2, which consists essentially of nitrogen gas, is conducted to the neighborhood of flue gas outlet section 9 of absorption tower 1 through venting equalizer 21.

On the other hand, the treated flue gas from which sulfur dioxide has been removed as a result of the gas-liquid contact flow toward flue gas outlet section 9. Since the flow velocity of the flue gas is high, the treated flue gas contains a large amount of mist. However, the mist contained in the flue gas loses in velocity during passage through the section of enlarged cross-sectional area and hence tends to fall down. Moreover, the mist is collected during the passage of the flue gas through mist eliminator 10 and returned to oxidation tank 2 through a circulation passage (not shown).

In the above-described manner, absorbing fluid 3 can be circulated by spouting absorbing fluid 3 from nozzles 7 by the action of pressure head h, without installing injection pumps having a particularly high power load. This makes it possible not only to reduce the operating cost, but also to decrease the overall cross-sectional area of the absorption tower owing to the high flow velocity of flue gas and thereby make the absorption tower more compact. Moreover, the number of nozzles can also be decreased under certain conditions.

It is to be understood that the present invention is not limited to the above-described embodiment. It goes without saying that gas-liquid contact apparatus having substantially the same construction and producing the same effects as that of the present invention also come within the technical scope of the present invention.

For example, catcher means 11 need not necessarily comprise gutter members. Instead, the direction of the streams spouted from nozzles 7 may be tilted to produce a spiral flow in absorption tower 1 and thereby catch the absorbing fluid 3 in a cyclone-like manner, or other means may be employed.

Moreover, if the spouted streams can be almost completely caught by catcher means 11, the underlying recovery pump 15 and related components may become unnecessary.

What is claimed is:

1. A gas-liquid contact apparatus for the desulfurization and other treatment of a flue gas, comprising:

an absorption tower through which flue gas flows;

a fluid reservoir external to said tower, and an absorbing fluid feed line in fluid communication with said fluid reservoir and with said absorption tower, wherein said fluid reservoir has a fluid level at or above which absorbing fluid is maintained;

upwardly directed nozzles disposed in said absorption tower below said fluid level, whereby an absorbing fluid stored in said fluid reservoir is spouted upwardly into a flue gas;

an inlet disposed in the lower part of said absorption tower for introducing the flue gas into said absorption tower, whereby said flue gas is introduced at the same time said nozzles spout said absorbing fluid, and whereby said flue gas flows upwardly through said absorption tower;

catcher means disposed at a position which is above said fluid level whereby said catcher means catches at least a portion of the absorbing fluid spouted from said nozzles;

a circulation passage in fluid communication with said catcher means and said fluid reservoir, whereby fluid caught by said catcher means is returned to said fluid reservoir;

wherein an upper part of said absorption tower contains an enlarged cross-sectional area;

wherein said circulation passage comprises a circulation pipe shielded from the atmosphere; and wherein said circulation pipe has a lower end extending downward and submerged in the absorbing fluid within said fluid reservoir, and an air pipe connected to said circulation pipe so that air is supplied to the absorbing fluid within said fluid reservoir simultaneously with return of the absorbing fluid.

2. A gas-liquid contact apparatus as claimed in claim 1 wherein mist collector means is installed within said absorption tower at a position above said gas-liquid contact region thereof, and the mist collected by said mist collector means is returned to said fluid reservoir.

3. A gas-liquid contact apparatus as claimed in claim 1 wherein the cross-sectional area of the upper part of said absorption tower is enlarged.

4. A gas-liquid contact apparatus as claimed in claim 1 wherein said fluid reservoir functions as an oxidation tank for effecting the oxidation reaction of the absorbing fluid.

5. A gas-liquid contact apparatus as claimed in claim 4 wherein said circulation passage for returning the absorbing fluid from said catcher means to said fluid reservoir comprises a circulation pipe shielded from the atmosphere.

6. A gas-liquid contact apparatus as claimed in claim 5 wherein said circulation pipe has a lower end extending downward and submerged in the absorbing fluid within said fluid reservoir, and an air pipe is connected to said circulation pipe so that air is supplied to the absorbing fluid within said fluid reservoir simultaneously with return of the absorbing fluid.

7. A gas-liquid contact apparatus as claimed in claim 1, wherein said enlarged cross-sectional area of the upper part of said absorption tower is of such magnitude that the flue gas flows at a velocity of not less than 5 m/sec.

8. A gas-liquid contact apparatus as claimed in claim 7, wherein said cross-sectional area is such that said velocity is in the range of 5 to 15 m/sec.

* * * * *